United States Patent
Sieger

[11] Patent Number: 5,860,191
[45] Date of Patent: Jan. 19, 1999

[54] EYEGLASS HOLDER AND SECURING DEVICE

[76] Inventor: Arlette Sieger, 28 Wood Valley La., Port Washington, N.Y. 11050

[21] Appl. No.: 914,539

[22] Filed: Aug. 19, 1997

[51] Int. Cl.[6] ............... A44B 21/00; A45F 5/00
[52] U.S. Cl. .................. 24/3.3; 24/3.1; 24/3.6; 24/13; 24/905; 351/156
[58] Field of Search ............... 24/3.3, 3.7, 3.6, 24/3.1, 13, 338, 493, 598.5, 905; 40/641; 351/156, 157

[56] References Cited

U.S. PATENT DOCUMENTS

| | | | |
|---|---|---|---|
| 175,821 | 4/1876 | Clawson | 24/13 |
| 319,293 | 6/1885 | Merritt . | |
| 509,551 | 11/1893 | Ohrnstedt . | |
| 845,743 | 3/1907 | Bindner | 24/3.6 |
| 867,255 | 10/1907 | Dietz | 24/3.6 |
| 1,566,192 | 12/1925 | Forrest . | |
| 3,040,404 | 6/1962 | Boger, Sr. | 24/905 |
| 3,267,534 | 8/1966 | Dansereau | 24/3.1 |
| 3,588,236 | 6/1971 | Moller . | |
| 3,798,712 | 3/1974 | Bonis . | |
| 4,452,354 | 6/1984 | Tabachnick . | |
| 4,458,384 | 7/1984 | Arnold . | |
| 4,496,224 | 1/1985 | Allen . | |
| 4,771,515 | 9/1988 | Guarro . | |
| 4,894,887 | 1/1990 | Ward, II . | |
| 4,930,885 | 6/1990 | Lachober | 351/156 |
| 5,000,410 | 3/1991 | Beavers . | |
| 5,033,612 | 7/1991 | Bivins . | |
| 5,046,696 | 9/1991 | Lee . | |
| 5,129,126 | 7/1992 | Huang . | |
| 5,235,727 | 8/1993 | McCloskey . | |
| 5,305,934 | 4/1994 | Grey . | |
| 5,329,670 | 7/1994 | Huang . | |
| 5,340,074 | 8/1994 | Porcaro et al. . | |
| 5,351,098 | 9/1994 | McDaniels et al. . | |
| 5,408,728 | 4/1995 | Wisniewski . | |
| 5,414,906 | 5/1995 | Kren . | |
| 5,491,878 | 2/1996 | Janouschek . | |
| 5,551,126 | 9/1996 | Wallo | 24/3.3 |

FOREIGN PATENT DOCUMENTS

| | | |
|---|---|---|
| 788663 | 7/1968 | Canada . |
| 0 028 981 A1 | 5/1981 | European Pat. Off. . |
| 725938 | 5/1932 | France . |
| 2 617 611 | 1/1989 | France . |
| 3017803 | 12/1980 | Germany ............ 24/3.6 |
| WO 94/12073 | 6/1994 | WIPO . |

OTHER PUBLICATIONS

*1996 Office Products Catalog*, distributed by World Class Business Products p. 365 Item I, 1995.

*Primary Examiner*—Victor N. Sakran
*Attorney, Agent, or Firm*—Hoffmann & Baron, LLP

[57] ABSTRACT

An eyeglass holder for securing eyeglasses to a material including a first clip for removably attaching the eyeglass holder to the material. The first clip including a first arm. The eyeglass holder further including an eyeglass support pivotally attached to the first arm for receiving and removably securing a portion of the eyeglasses thereto. The support being rotatable about a first axis and a second axis. The second axis is offset from the first axis, thereby allowing the support to maintain a vertical position with regard to gravity substantially independent of a position of the first clip.

20 Claims, 6 Drawing Sheets

EYEGLASS HOLDER AND SECURING DEVICE

FIELD OF THE INVENTION

The present invention relates to an eyeglass holder for holding and securing eyeglasses when not in use. More specifically, the present invention relates to an eyeglass holder for rotatably securing a pair of eyeglasses to an article of clothing, bag, case or the like.

BACKGROUND OF THE INVENTION

Individuals who wear eyeglasses are often encountered with the problem of how to safely secure their eyewear when temporarily not in use. This problem is especially prevalent for those who use eyewear which is frequently removed and replaced such as sunglasses or reading glasses. Once removed, eyeglasses may be placed in a traditional eyeglass case and placed in a pocket or handbag, however, this process is unduly involved especially if the glasses are to be removed only for a short period of time. Moreover, eyeglass cases are often bulky making them unsuitable for placing on pockets found on garments. In addition, eyeglasses which are placed in pockets are subject to falling out resulting in damage, and eyeglasses placed in a purse or handbag may be difficult to locate especially if various articles are also contained within the bag.

Numerous attempts have been made to solve the problem associated with the storing of eyeglasses in a manner which provides quick and easy access to the eyeglasses. One well-known manner of securing eyeglasses includes attaching a strap to the ends of each eyeglass temple arm thereby permitting the glasses to be hung around the wearer's neck when not in use. However, eyeglasses secured in this manner tend to swing around striking objects in front of the wearer and may impede the wearer's activity due to the eyewear swinging about. In addition, the strap does not provide much flexibility in how the eyewear may be attached to use of a user.

Several U.S. patents disclose devices directed to the securing of eyewear. U.S. Pat. No. 4,894,887 to Ward, II discloses an eyeglass retainer having an oval-shaped loop rigidly secured to a resiliently biased clip. The eyeglasses are secured to a retainer by inserting the eyeglass temple arm through the loop from which the eyeglasses pendulously hang. The retainer may be clipped to an article of clothing to secure the eyeglasses. The loop remains in a fixed position, and therefore, the eyeglasses rotate about the loop in order to remain in a substantially vertical orientation as the retainer and clothing to which it is attached move about.

This design has several limitations. Since the loop is rigidly fixed to the clip, the clip must be maintained in a substantially vertical orientation so that the loop is properly positioned to effectively secure the eyeglasses. Therefore, the variety of places and positions where the retainer may be attached is limited. Additionally, the loop must be of a certain size to properly retain the eyeglasses. The size results in a relatively narrow slot which would make it difficult to quickly insert and remove the temple arm. Securing the eyeglasses would be especially difficult if the removal of the eyeglass makes it difficult for an individual to see the slot.

U.S. Pat. Nos. 5,046,696 to Lee; 5,033,612 to Bivins; and 4,523,542 to Tabachnick also disclose eyeglass holders which must be positioned in a particular orientation in order to properly secure the eyeglasses.

U.S. Pat. No. 5,351,098 discloses a pocket retainer for eyeglasses. However, in order to retain and remove the eyeglasses from the device, a spring, operated lever must be engaged and disengaged thereby complicating the procedure involved in securing the eyeglasses.

Accordingly, it would be desirable to provide an eyeglass holder which can be positioned in almost any orientation and still properly secure the eyeglasses. It would also be desirable to provide an eyeglass holder that allows for ease in securing and removing the eyeglasses from the holder.

SUMMARY OF THE INVENTION

The present invention provides an eyeglass holder for securing eyeglasses to a material including a first clip for removably attaching the holder to the material. The first clip includes a first arm. The holder further includes an eyeglass support pivotally attached to the first arm for receiving and removably securing a portion of the eyeglasses thereto. The support is rotatable about both a first axis and a second axis, the second axis being offset from the first axis thereby allowing the support to maintain a vertical position with regard to gravity substantially independent of a position of the first clip.

The present invention further provides an eyeglass holder for securing eyeglasses to a material including a first clip for removably attaching the holder to the material. The first clip includes a first arm. The holder further includes an eyeglass support pivotally attached to the first arm for receiving and removably securing the eyeglasses thereto. The support is rotatable relative to the first arm substantially 360 degrees about a first axis such that the eyeglasses may assume a vertical orientation with regard to gravity substantially independent of the first clip.

The present invention still further provides a first clip for removably securing the holder to the material including a first arm pivotally connected to a second arm. A second clip is provided for removably securing the apparatus to the material including a third arm resiliently secured to the second arm. The holder further includes an eyeglass support for removably securing the eyeglasses to the holder.

DETAILED DESCRIPTION OF THE PREFERRED EMBODIMENTS

The eyeglass holder of the present invention allows for a pair of eyeglasses to be secured to a support material such as an article of clothing, purse, handbag, briefcase or the like in a safe and secure manner. The term material is used throughout this disclosure to include any element such as clothing, handbags and the like to which the holder may be fastened. Eyeglasses are typically stored in pockets or purses and are prone to either falling out, being difficult to locate or suffering damage to the frames or lenses. Eyeglass holders of the prior art tend to rigidly secure the eyewear so that they are difficult to remove. Conversely, holders which provide for ease of insertion and removal provide inadequate securement of the eyewear especially when the holder is attached to a material which moves about such an individual's clothing. The eyeglass holder of the present invention overcomes the problems associated with prior art holders by allowing the device which secures the eyeglasses to rotate relative to the material. The eyeglass holder of the present invention permits the eyeglasses to maintain a substantially vertical downward suspended position substantially independent of the orientation of the material to which the holder is attached and to provide for quick and simple insertion and removal of the eyewear. Furthermore, the eyeglass holder may be secured to a material in a variety of manners in order to accommodate a wide range of applications.

Figure 1:
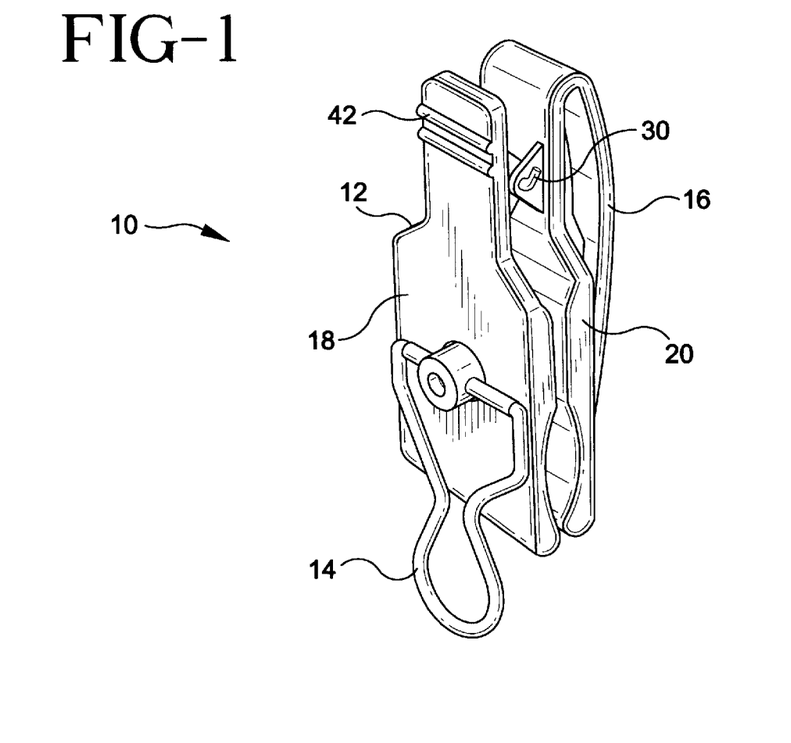
FIG. 1 is a front perspective view of the eyeglass holder of the present invention.
Figure 3:
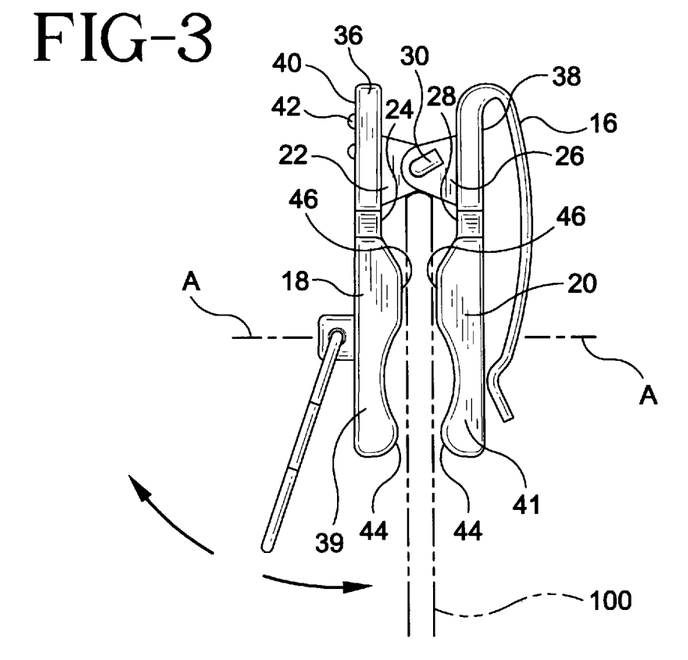
FIG. 3 is a side elevational view of the eyeglass holder of the present invention shown in the open position.
Figure 5:
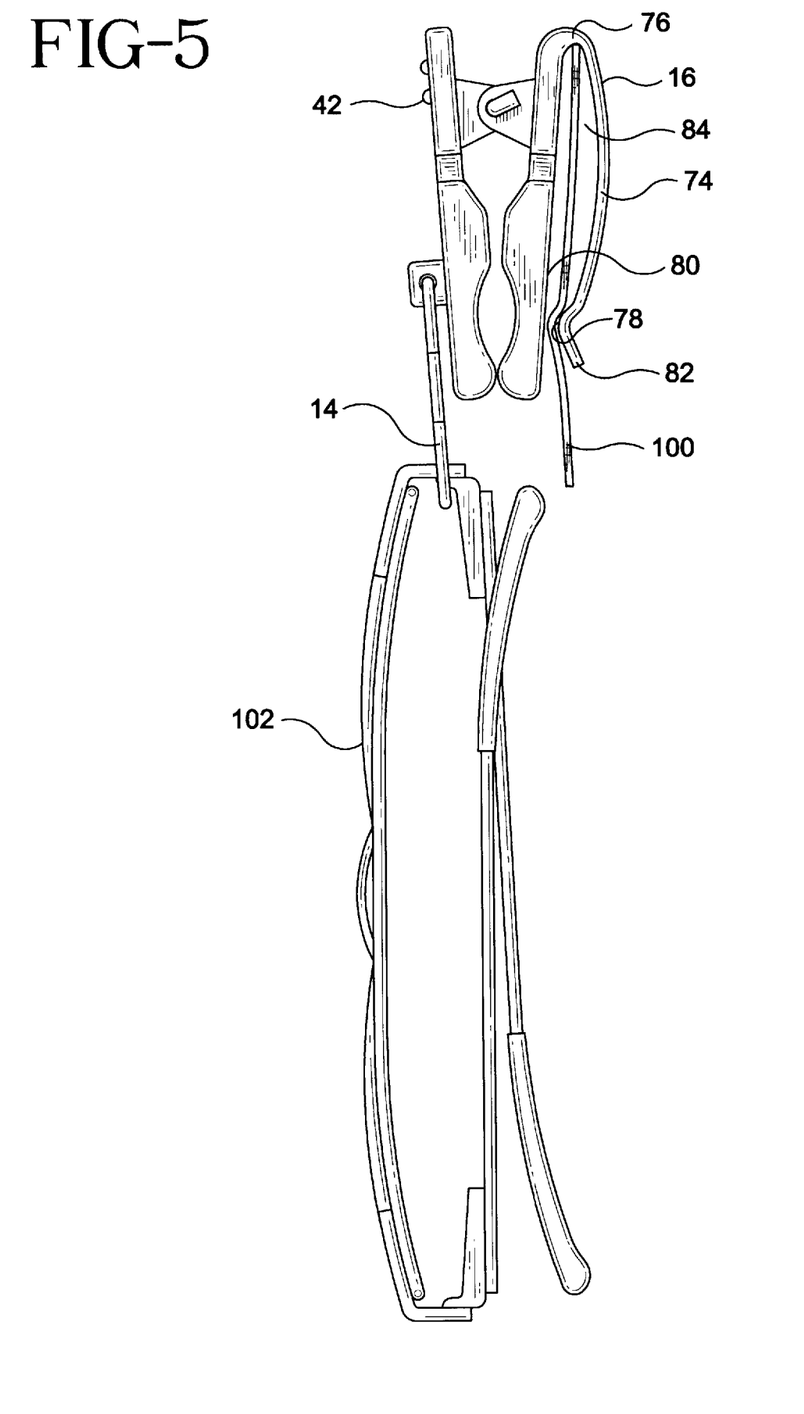
FIG. 5 is a side elevational view of the eyeglass holder of the present invention show with a pair of eyeglasses mounted on an eyeglass support with the eyeglass holder secured to a material.
Figure 6:
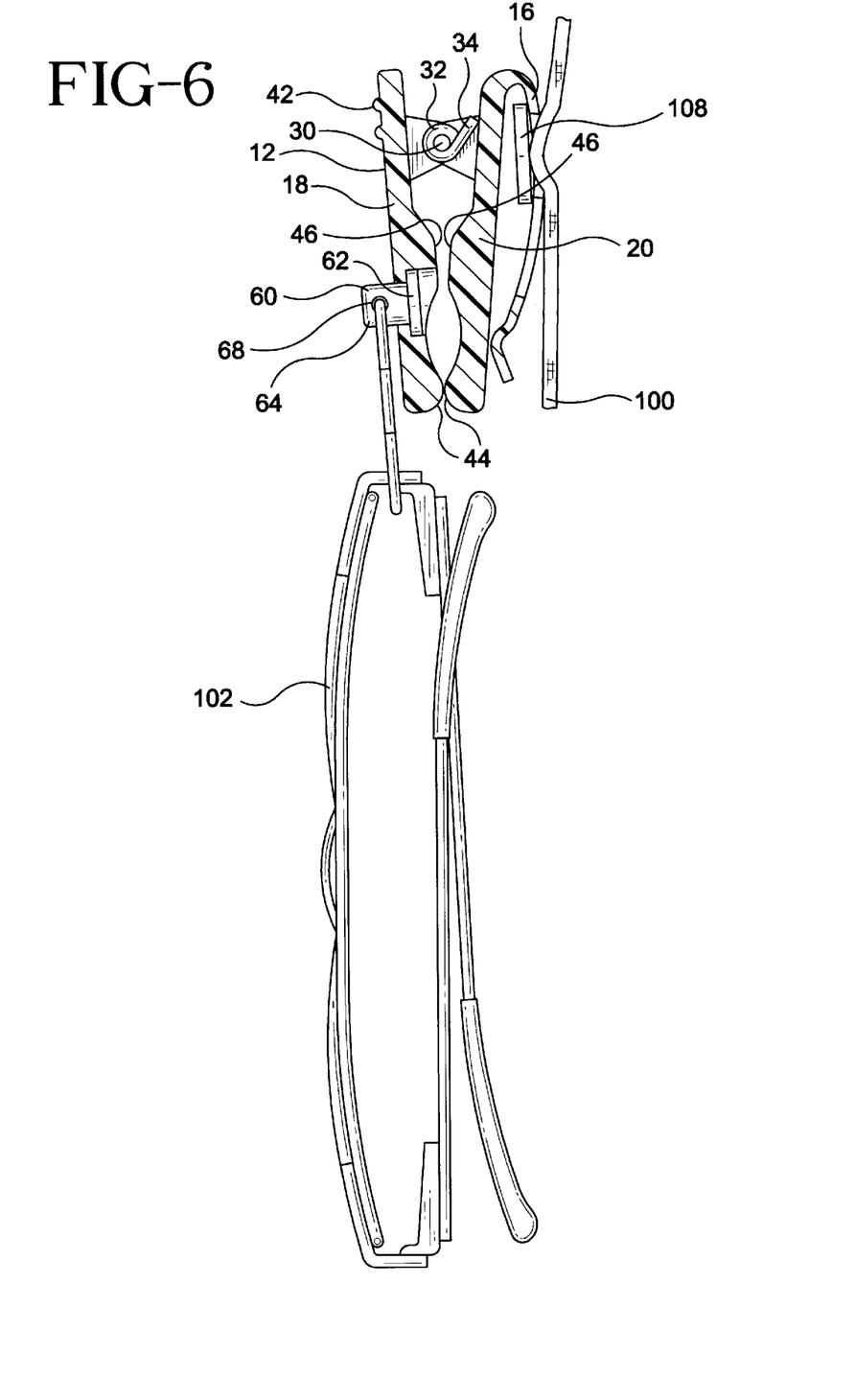
FIG. 6 is a partial vertical cross-sectional side view of the eyeglass holder of the present invention shown with a pair of eyeglasses secured to the eyeglass support and the eyeglass holder secured to a button.
Figure 7:
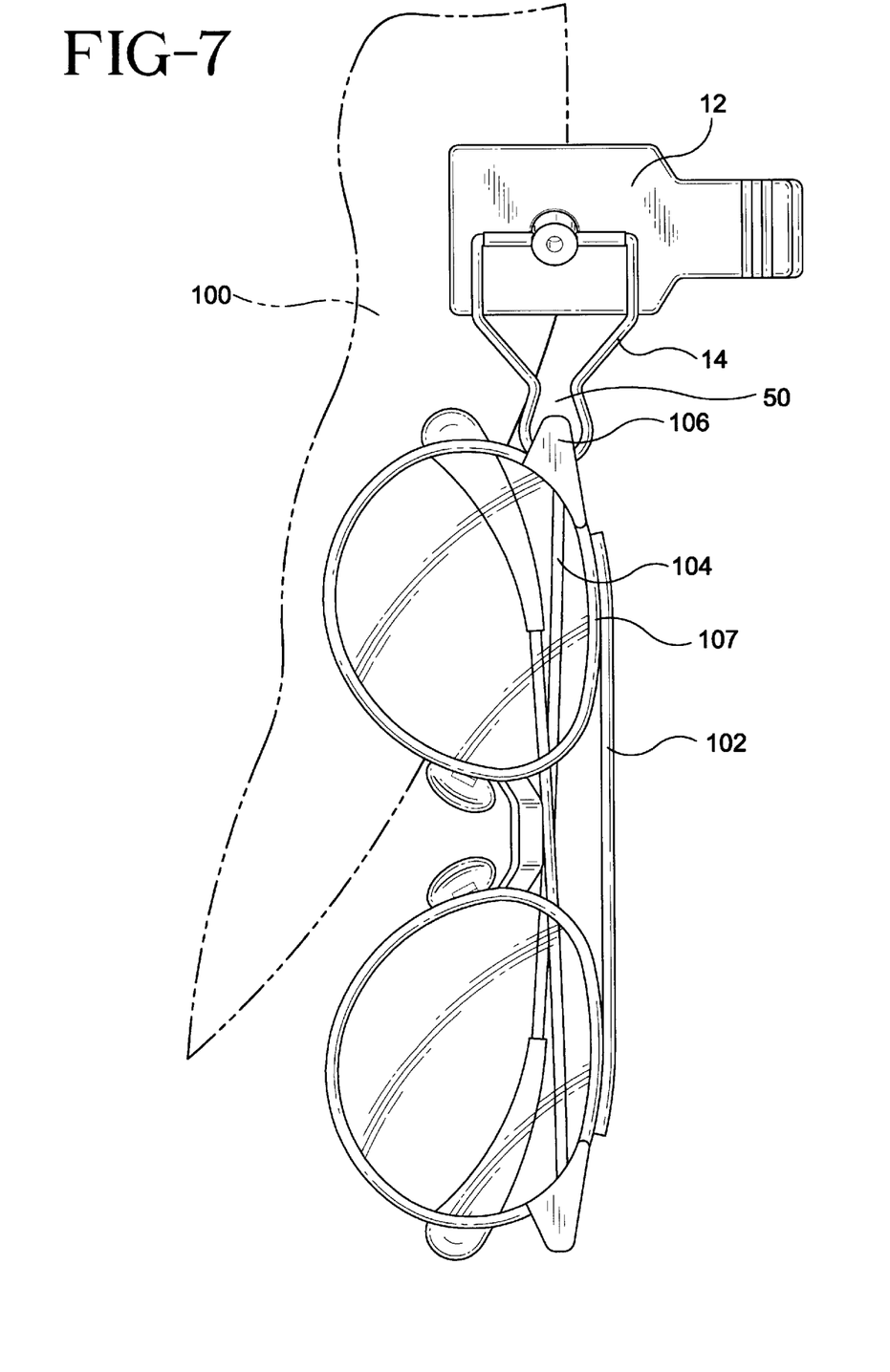
FIG. 7 is a front elevational view of the eyeglass holder of the present invention shown with a pair of eyeglasses suspended substantially perpendicular to the length of the eyeglass holder which is secured to the material.

The eyeglass holder 10 of the present invention is shown in FIG. 1. Eyeglass holder 10 preferably includes a spring clamp 12 which may engage a material 100 such as an article of clothing, purse, briefcase or the like in order to clamp eyeglass holder 10 thereto as shown in FIG. 3. An eyeglass support 14 pivotally connected to spring clamp 12 is provided to support a pair of eyeglasses 102, as shown in FIGS. 5–7. Eyeglass holder may also include a flex clip 16 as an additional or alternative device for securing eyeglass holder 10 to a material.

Spring clamp 12 will now be described. Referring to FIGS. 1, 3 and 6, spring clamp 12 includes a paddle shaped first jaw 18 pivotally connected to a similarly configured second jaw 20. First and second jaws 18, 20 are preferably formed of a molded plastic material, however, they may alternatively be formed from a metallic material. In order to effect the pivotal connection between jaws 18, 20, first jaw 18 may include a pair of substantially triangular supports 22 extending outwardly from an inner surface 24. Second jaw 20 may include a second pair of triangular shape supports 26 projecting from second jaw inner surface 28. First jaw 18 and second jaw 20 are so positioned such that the first and second pair of triangular supports 22, 26 align allowing for pin 30 to extend therethrough. A helical spring 32 having a pair of linearly protruding ends 34 may be inserted over pin 30 in order to urge spring clamp 12 toward a closed position shown in FIG. 6. One of the ends 34 engages first jaw 18 and the other end engages second jaw 20 thereby biasing jaws 18,20 to the closed position in a manner well known on the art. It is understood that the pivotal connection between first and second jaws 18,20 and biasing function of spring 32 could be provided by a variety of devices well known in the art such as a U-shaped piece of spring steel placed between and connecting the first and second jaws (not shown).

Spring clamp 12 may be opened by squeezing together the first and second jaw free ends 36,38 together in order to overcome the force exerted by spring 32. When first and second jaws 18,20 are in the open position material 100 may be placed therebetween. Upon release of clamp 12, jaws 18,20 will be urged to a closed position by spring 32 thereby effectively clamping the eyeglass holder to the supporting material 100 between jaw clamping ends 39,41. First jaw 18 may include a grasping portion 40 which includes a finger catch including a plurality of raised ridges 42. Ridges 42 tend to provide an irregular surface so that the user's fingers do not slip from spring clamp 12 while urging the clamp toward the opened position. Grasping portion could be formed in a variety of configurations such as a depression or grooves (not shown).

First jaw 18 and second jaw 20 have opposed inner surfaces 24,28 which may include opposed lower clamping surfaces 44 and upper clamping surfaces 46 as shown in FIG. 3. Clamping surfaces 44 and 46 engage the material 100 when spring clamp 12 is in the closed position thereby securing the eyeglass holder 10 to the material 100. In the closed position, shown in FIG. 6, lower clamping surfaces 44 preferably engage each other thereby allowing spring clamp 12 to even grab relatively thin objects such as a shirt pocket. However, in order to permit relatively thick materials to be clamped, upper clamping surfaces 46 are preferably spaced from each other when spring clamp 12 is in the closed position. As spring clamp 12 is opened, upper clamping surfaces 46 move apart to a lesser degree than lower clamping surfaces 44 since the upper clamping surfaces 46 are positioned adjacent pin 30, the effective point of rotation. Accordingly, by maintaining the upper clamping surfaces in spaced relation, thicker materials may be inserted between first and second jaws 18, 20. Therefore, spring clamp 12 is well adapted to clamp materials such as a coat lapel, purse or briefcase flap.

Referring to FIGS. 2, 3, 6 and 7, eyeglasses 102 are secured to eyeglass holder 10 by suspending them from eyeglass support 14. The eyeglass temple arm 104 is placed through the support 14 and the eyeglasses are suspended therefrom. Eyeglass support 14 is preferably a wire framed structure pivotally connected to first jaw 18. Eyeglass support 14 is preferably connected to first jaw 18 such that support 14 may rotatably translate about two axes which allows the eyeglass to maintain a substantially downward vertical position relative to gravity substantially independent of the position of spring clamp 12. Support 14 preferably rotates substantially 360 degrees about an axis A—A, shown in FIG. 3, to provide one degree of movement. A second degree of movement is provided by allowing support 14 to rotate substantially 180 degrees about a second axis B—B, shown in FIG. 2. Axes A—A and B—B are preferably substantially perpendicular to each other thereby permitting support 14 to achieve a wide range of orientations. The ability of eyeglass support 14 to rotate relative to clamp 12 about two substantially perpendicular axes allows the eyeglasses secured on support 14 to maintain an orientation substantially independent from the orientation of spring clamp 12 and material 100 to which it is attached. Accordingly, eyeglasses 102 may be securely retained in support 14 even when the material or the clamp 12 is moved about in various positions.

Figure 2:
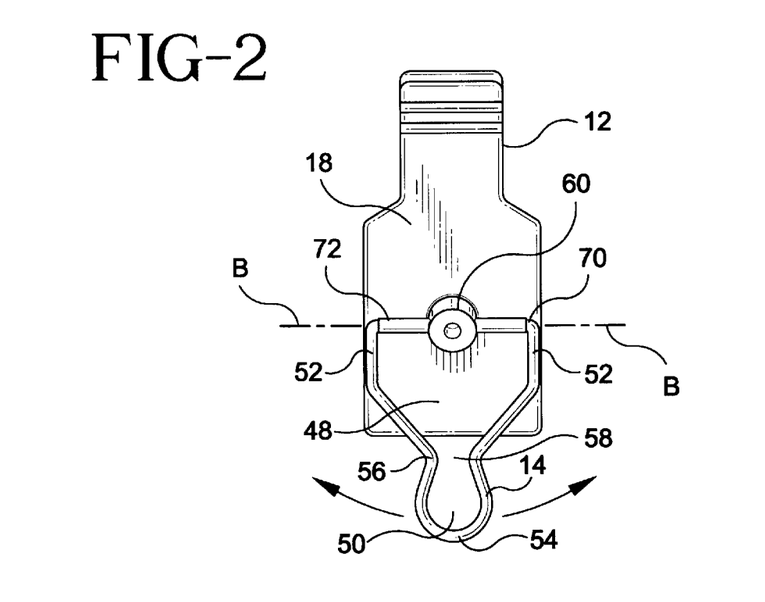
FIG. 2 is a front elevational view of the eyeglass holder of FIG. 1.

With reference to FIGS. 2 and 7, eyeglass support 14 is preferably formed by a curved metallic wire structure which peripherally bounds and defines an upper and lower aperture 48,50 with upper aperture 48 being larger than lower aperture 50. Upper aperture 48 may include elongate sides 52 which extend toward a rounded portion 54 forming lower aperture 50. The length of sides 52 are such that lower aperture 50 will extend just beyond the clamping ends 39,41 of spring clamp 12. Upper and lower apertures 48,50 are separated by a narrow neck portion 56 which defines a gap 58. Gap 58 is sized to permit an eyeglass temple arm 104 to extend therebetween, yet not wide enough to easily allow passage of the arm from lower aperture 48 to the upper aperture 50 when the eyeglasses are jostled about during movement of the material 100 to which eyeglass holder 10 is attached.

In order to secure eyeglasses 102 onto eyeglass support 14, eyeglass temple arm 104 is rotated outwardly toward an open position and is then inserted through upper aperture 48. Temple arm 104 may then be rotated toward a closed position over support 14, thereby securing eyeglasses 102 to support 14. The weight of eyeglasses 102 results in temple arm 104 moving downwardly past the neck portion 56 and into lower aperture 50. As shown in FIGS. 5, 6 and 7, it is in lower aperture 50 where eyeglasses 102 are pendulously suspended from support 14 at a portion of the eyeglasses adjacent to eyeglass hinge 106 where temple arm 104 is connected to eyeglass frame 107. While upper aperture 48 permits ease of insertion of eyeglasses into support 14, it is within the scope of the present invention to provide a support having only one aperture (not shown) through which a temple arm may be inserted and from which eyeglasses 102 may hang.

Eyeglasses 102 may be removed from holder 10 by simply lifting them away from support 14 such that temple arm 104 slides over and past support 14. Accordingly, the manner in which eyeglasses are suspended from support 14 provides for the eyeglasses 102 to be securely held by support 14, as well as providing for eyeglasses 102 to be both quickly and easily inserted and removed from holder 10.

Holder 10 may be clamped to material in a variety of orientations and still securely hold eyeglasses 102. For example, referring to FIG. 7, even if the clip is secured in a horizontal position, the weight of the eyeglasses will rotate support 14 toward a vertical position thereby permitting eyeglasses 102 to remain suspended on lower aperture 50 of support 14. Accordingly, eyeglass holder 10 may be attached to material 100 in a variety of orientations and still properly secure eyeglasses 102, thereby making holder 10 suitable for a wide range of applications. For example, if an individual has eyeglass holder 10 clamped to their person on an article of clothing, activity such as moving about, jogging or leaning over will not result in eyeglasses 102 from becoming separated from eyeglass support 14. Since support 14 can change its orientation along with the movement of eyeglasses 102, the eyeglasses remain substantially vertical relative to gravity and maintain in contact with support 14. Even when the eyeglasses are jostled or shaken the eyeglasses will tend to remain in lower aperture 50 due to the relatively narrow neck portion 56. In addition, the size of lower aperture 50 will tend to limit any undesirable movement of eyeglasses 102 relative to support 14. Furthermore, in that eyeglasses 102 are suspended from support 14, eyeglasses 102 may even rotate, to some degree, relative to support 14 thereby further permitting the eyeglasses to assume an orientation which tends to maintain them within support 14.

Referring to FIGS. 2 and 6, in order to provide the dual axes rotation of support 14, support 14 may be pivotally secured to a pivot post 60 which is rotatably connected to spring clamp 12. Pivot post 60 may include a generally cylindrical member having a head portion 62 extending radially outwardly from the end of a body portion 64. Body portion 64 extends through a stepped aperture 66 formed in first jaw 18 and head portion 62 engages the first jaw to rotatably retain pivot post 60 therein. Pivot post 60 permits support 14 to freely rotate 360 degrees relative to clamp 12 about axis A—A. In addition, body portion 64 includes a radially extending aperture 68 through which a transverse member 70 of eyeglass support 14 may extend and pivot within. This manner of connection allows support 14 to rotate through a 180 degree arc about axis B—B. In the preferred embodiment, a plastic sleeve 72 may extend through pivot post aperture 68 and rotatably support transverse member 14 which extends into and through sleeve 72. Accordingly, pivot post 60 permits eyeglass support 14 to rotate about axes A—A and B—B in order to provide the two degrees of movement.

In addition to spring clamp 12, eyeglass holder 10 may further include a flex clip 16 for providing an alternative or additional device for securing holder 10 to a support material. In the preferred embodiment, flex clip 16 includes a resilient elongate member 74 having an upper rounded end 76 secured to an upper end of second jaw 20, as shown in FIGS. 5 and 6. The resilient nature of elongate member 74 permits flex clip 16 to move relative to second jaw 20. However, flex clip 16 tends to resist such movement thereby giving clip 16 a spring-like nature. Flex clip 16 includes a gripping surface 78 which engages a portion of material 100 forcing it against the outer surface 80 of second jaw 20 to assist in securing holder 10 to material 100. Flex clip 16 is preferably integrally formed with second jaw 20 and molded as one piece out of a suitable plastic material. In an alternative embodiment, a piece of spring steel or other suitable material may be molded into the plastic to provide increased resiliency.

Flex clip 16 may be formed such that in a relaxed closed position gripping surface 78 tends to be biased against or just slightly spaced from second jaw outer surface 80. Eyeglass holder 10 may be secured to a material via flex clip 16 by inserting material 100 between flex clip 16 and second jaw 20 as shown in FIG. 5. In order to facilitate entry of the material into clip 16 elongate member 74 preferably includes an outwardly turned distal end 82. The material tends to move clip distal end 82 away from second jaw 20 in order to create an opening through which material 100 may pass. The material may extend beyond the gripping surface 78 into a clip space 84 defined by elongate portion 74 and second jaw 20 where it may then rest adjacent to rounded upper portion 76. The resilient spring-like nature of flex clip 16 tends to pinch material 100 between gripping surface 84 and the second jaw 20 thereby retaining the eyeglass holder 10 to the material 100. Flex clip 16 is especially useful in securing the eyeglass holder 10 to a pocket on a garment or on a case such as a purse or briefcase. Flex clip 16 may also be easily clipped onto a neckline of a sweater or shirt. In addition, flex clip 16 may be clipped onto and hung from a strap or belt such that the width of the strap fits entirely within clip space 84 (not shown).

Furthermore, when a user squeezes holder 10 to open spring clamp 12, a portion of flex clip 16 will be grasped due to its attachment to second jaw 20. Accordingly, in an alternative embodiment flex clip 16 may also include a grasping portion including ridges (not shown) similar to those formed on first jaw 18.

Figure 4:
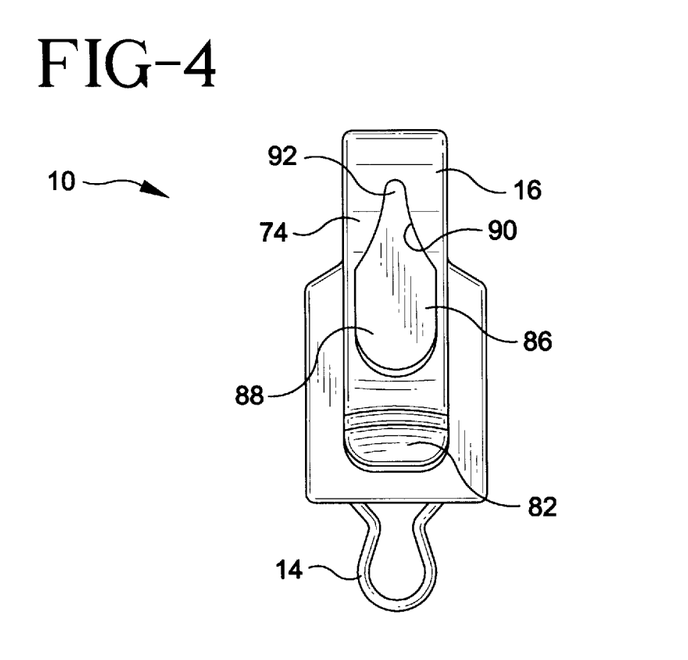
FIG. 4 is a rear elevational view of the eyeglass holder of FIG. 1.

Referring to FIGS. 4 and 6, eyeglass holder 10 may further include a button holding aperture 86 formed in flex clip 16 which allows holder 10 to be secured to a garment or case having buttons. Button holding aperture 86 provides yet another alternative means for attaching eyeglass holder 10 to a material 100. Button holding aperture 86 is formed in clip elongate member 74 and includes an insert opening 88 which is sized to receive the diameter of a button 108.

Once button 108 is within opening 88 eyeglass holder 10 may be moved downwardly with respect to button 108 such that side edges 90 of tapered portion 92 engage the back surface of the button 108 and the material to which button 108 is attached. Tapered portion 92 is so sized such that button 108 cannot be pulled outwardly therefrom. In order to remove eyeglass holder 10 from button 108, the holder must be moved upwardly such that the button aligns with insert opening 88.

Figure 8:
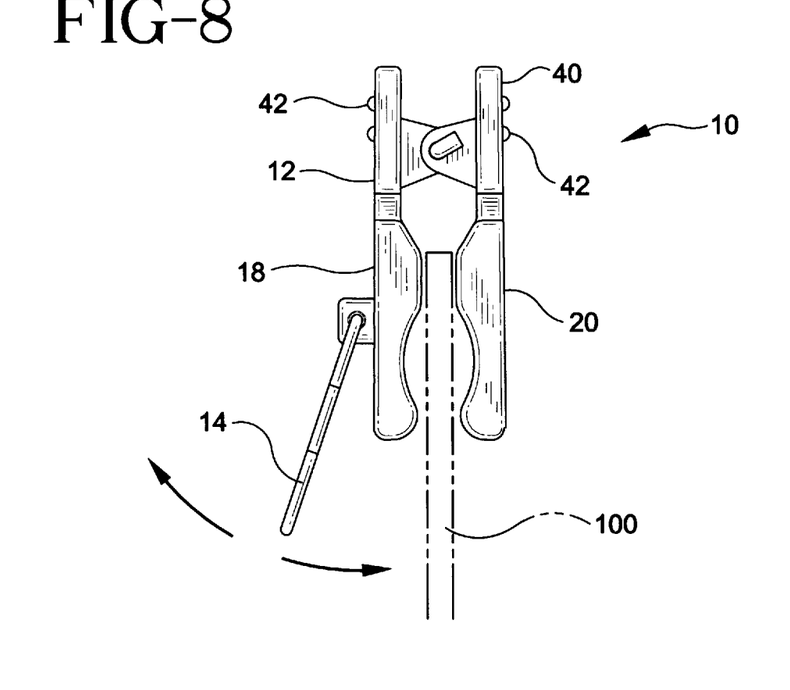
FIG. 8 is a side elevational view of an alternative embodiment of the eyeglass holder of the present invention.

In an alternative embodiment shown in FIG. 8, eyeglass holder 10 may be provided without a flex clip. In this embodiment, a user would directly grasp both first and second jaws 18,20 in order to open spring clamp 12. Therefore, second jaw 20 may include a grasping portion 40 having a plurality of ridges 42. Additionally, a button holding aperture 86 may also be formed into second jaw 20 (not shown).

Figure 9:
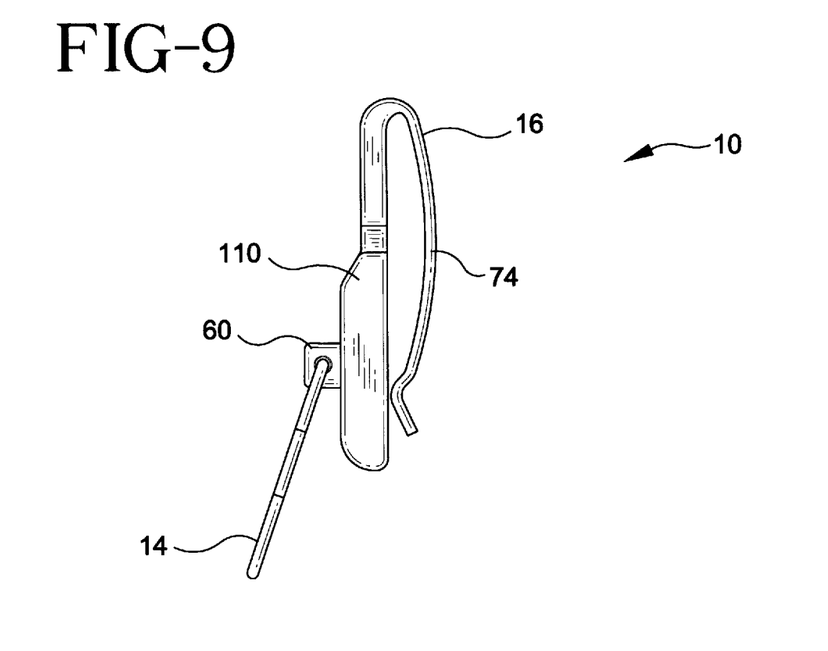
FIG. 9 is a side elevational view of a further alternative embodiment of the eyeglass holder of the present invention.

In a further alternative embodiment shown in FIG. 9, eyeglass holder 10 may be provided without a spring clamp such that eyeglass support 14 is rotatably secured directly to flex clip 16. Flex clip 16 may include an elongate clip arm 110 from which elongate portion 74 extends. Support 14 may be attached to clip arm 110 by pivot post 60 in a similar manner in which it is secured to first jaw 18 in the preferred embodiment described above. Additionally, button holding aperture 86 may also be formed into flex clip elongate portion 74.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An eyeglass holder for securing eyeglasses having a temple arm to a material comprising:
    a first clip for removably attaching said eyeglass holder to the material, said first clip including a first arm; and
    an eyeglass support pivotally attached to said first arm for receiving and removably securing a portion of said eyeglasses thereto, said support being rotatable about a first axis and a second axis, said second axis being offset from said first axis thereby allowing said support to maintain a vertical position with regard to gravity substantially independent of a position of said first clip, said support defining a first aperture for receiving the temple arm of the eyeglasses and a second aperture depending from and in communication with said first aperture, and a neck portion extending between said first and second apertures, said neck portion forming a gap being sized to permit the eyeglass temple arm to pass from said first aperture to said second aperture and provide resistance from movement of the temple arm from the second aperture to the first aperture.

2. The eyeglass holder as defined in claim 1 wherein said first axis is substantially perpendicular to said second axis.

3. The eyeglass holder as defined in claim 1 wherein said eyeglass support is formed of a substantially continuous metallic wire frame.

4. The eyeglass holder as defined in claim 1 further including a post, said post being rotatably secured to said first arm and containing an aperture therethrough, said post being rotatable about said first axis; and
    said eyeglass support including an elongate portion which extends through said post aperture thereby rotatably securing said eyeglass support to said post and permitting said eyeglass support to be rotatable about said second axis.

5. The eyeglass holder as defined in claim 4 wherein said support is rotatable substantially 180 degrees about said second axis.

6. The eyeglass holder as defined in claim 1 wherein said first clip includes a second arm connected to said first arm and disposed substantially opposed from and adjacent to said first arm, said first and second arms being movable relative to each other; and
    a biasing means for urging a portion of said first arm against a portion of said second arm thereby urging said first clip toward a first clip closed position and permitting said first clip to clamp the material between said first and second arms.

7. The eyeglass holder as defined in claim 6 wherein said biasing means includes a spring which urges said first and second arms toward said first clip closed position.

8. The eyeglass holder as defined in claim 7 wherein said first and second arms each have an upper end which are in opposed spaced relation when said first clip is in said closed position, said first clip being moved toward an open position upon pressing said upper ends toward each other.

9. The eyeglass holder as defined in claim 8 wherein said first and second arms have opposed inward surfaces and each of said inward surfaces having opposed first grasping surfaces for engaging the material when said first clip is in said closed position.

10. The eyeglass holder as defined in claim 9 wherein said inward surfaces of said first and second arms each include a second opposed grasping surface spaced between said first grasping surface and said connection point for engaging the material when said first clip is in said closed position.

11. The eyeglass holder as defined in claim 7 further including a second clip for securing said eyeglass holder to the material, said second clip including a third arm resiliently secured to said first clip; and
    a means for biasing said third arm toward said first clip for securing the material between said third arm and said first clip.

12. The eyeglass holder as defined in claim 11 wherein said third arm is a resilient member extending from said second arm forming said biasing means.

13. The eyeglass holder as defined in claim 12 wherein said third arm includes an aperture for receiving and retaining a button attached to a garment or the like thereby permitting said eyeglass holder and eyeglasses to be secured thereto.

14. The eyeglass holder as defined in claim 6 wherein said first and second arms are pivotally secured to each other about a connection point.

15. The eyeglass holder as defined in claim 6 wherein said second arm is a resilient member extending from said first arm forming said biasing means.

16. The eyeglass holder as defined in claim 15 wherein said second arm has a distal end, and said first clip is moved from a closed position to an open position upon urging said distal end away from said first arm.

17. The eyeglass holder as defined in claim 15 wherein said first and second arms are integrally formed.

18. The eyeglass holder as defined in claim 15 wherein said second arm includes a means for securing said eyeglass holder to a button attached to the material.

19. The eyeglass holder as defined in claim 18 wherein said means for securing said eyeglass holder to a button includes an aperture for receiving the button, said aperture having a tapered end portion for securing the button to said eyeglass holder.

20. An eyeglass holder for securing eyeglasses to a material comprising:

a first clip for removably attaching said eyeglass holder to the material, said first clip including a first arm and a second arm pivotally connected to said first arm and disposed substantially opposed from and adjacent to said first arm, said first and second arms being movable relative to each other between an open and clamping position, a first biasing means for urging a portion of said first arm against a portion of said second arm thereby urging said first clip toward the clamping position and permitting said first clip to clamp the material between said first and second arms, said first and second arms having an upper portion and said first clamp being movable toward the open upon pressing said first and second arm upper portions toward each other;

a second clip for securing said eyeglass holder to the material, said second clip including a third arm resiliently secured to said first clip, and a second biasing means for urging said third arm toward said first clip for securing the material between said third arm and said first clip, said third arm having an elongate slot formed therein for attachment to a support surface; and an eyeglass support pivotally attached to said first arm for receiving and removably securing a portion of said eyeglasses thereto, said support being rotatable about a first axis and a second axis, said second axis being offset from said first axis thereby allowing said support to maintain a vertical position with regard to gravity substantially independent of a position of said first clip.

\* \* \* \* \*

UNITED STATES PATENT AND TRADEMARK OFFICE
CERTIFICATE OF CORRECTION

PATENT NO. : 5,860,191
DATED : January 19, 1999
INVENTOR(S) : Arlette Sieger

It is certified that error appears in the above-identified patent and that said Letters Patent is hereby corrected as shown below:

In Column 2, line 1, "a spring," should be --a spring--;

In Column 2, line 52, "invention show" should be -- invention shown--

Signed and Sealed this

Fifth Day of October, 1999

Attest:

Attesting Officer

Q. TODD DICKINSON
Acting Commissioner of Patents and Trademarks